United States Patent [19]

Weber et al.

[11] Patent Number: 4,684,211
[45] Date of Patent: Aug. 4, 1987

[54] FIBER OPTIC CABLE PULLER

[75] Inventors: Robert N. Weber, Hummelstown; William J. Stape, Lewisberry, both of Pa.

[73] Assignee: AMP Incorporated, Harrisburg, Pa.

[21] Appl. No.: 707,480

[22] Filed: Mar. 1, 1985

[51] Int. Cl.[4] .............................................. G02B 6/36
[52] U.S. Cl. .......................... 350/96.20; 254/134.3 R
[58] Field of Search ............... 350/96.20, 96.21, 96.22; 254/134.3 FT, 134.3 SC, 134.3 CL, 134.3 R

[56] References Cited

U.S. PATENT DOCUMENTS

| | | | |
|---|---|---|---|
| 4,319,802 | 3/1982 | Bowes | 350/96.20 |
| 4,337,923 | 7/1982 | Smith | 254/134.3 FT |
| 4,411,409 | 10/1983 | Smith | 254/134.3 FT |
| 4,447,120 | 5/1984 | Borsuk | 350/96.20 |
| 4,447,121 | 5/1984 | Cooper et al. | 350/96.20 |
| 4,460,159 | 7/1984 | Charlebois et al. | 254/134.3 R |
| 4,496,212 | 1/1985 | Harvey | 350/96.20 |
| 4,516,830 | 5/1985 | Guazzo | 350/96.22 |
| 4,576,437 | 3/1986 | Ohta et al. | 350/96.20 |
| 4,609,181 | 9/1986 | Fisher et al. | 254/134.3 FT |

Primary Examiner—James W. Davie
Assistant Examiner—Frank González

[57] ABSTRACT

A device for pulling fiber optic cable through ducts and conduits comprises an elongated housing having a closed forward end, an open rearward end, and a central bore extending longitudinally therethrough for reception of a pre-terminated fiber optic cable including one or more ferrules terminated in corresponding ferrules which rest within the housing, the forward end being provided with grasping means, and the rearward end being adapted for mounting to a tensile load-bearing portion of the terminated end of the fiber optic cable. In a preferred embodiment, the rearward end is provided with threads for threaded engagement with a receptor nut mounted on the strain relief of a terminated fiber optic cable.

3 Claims, 4 Drawing Figures

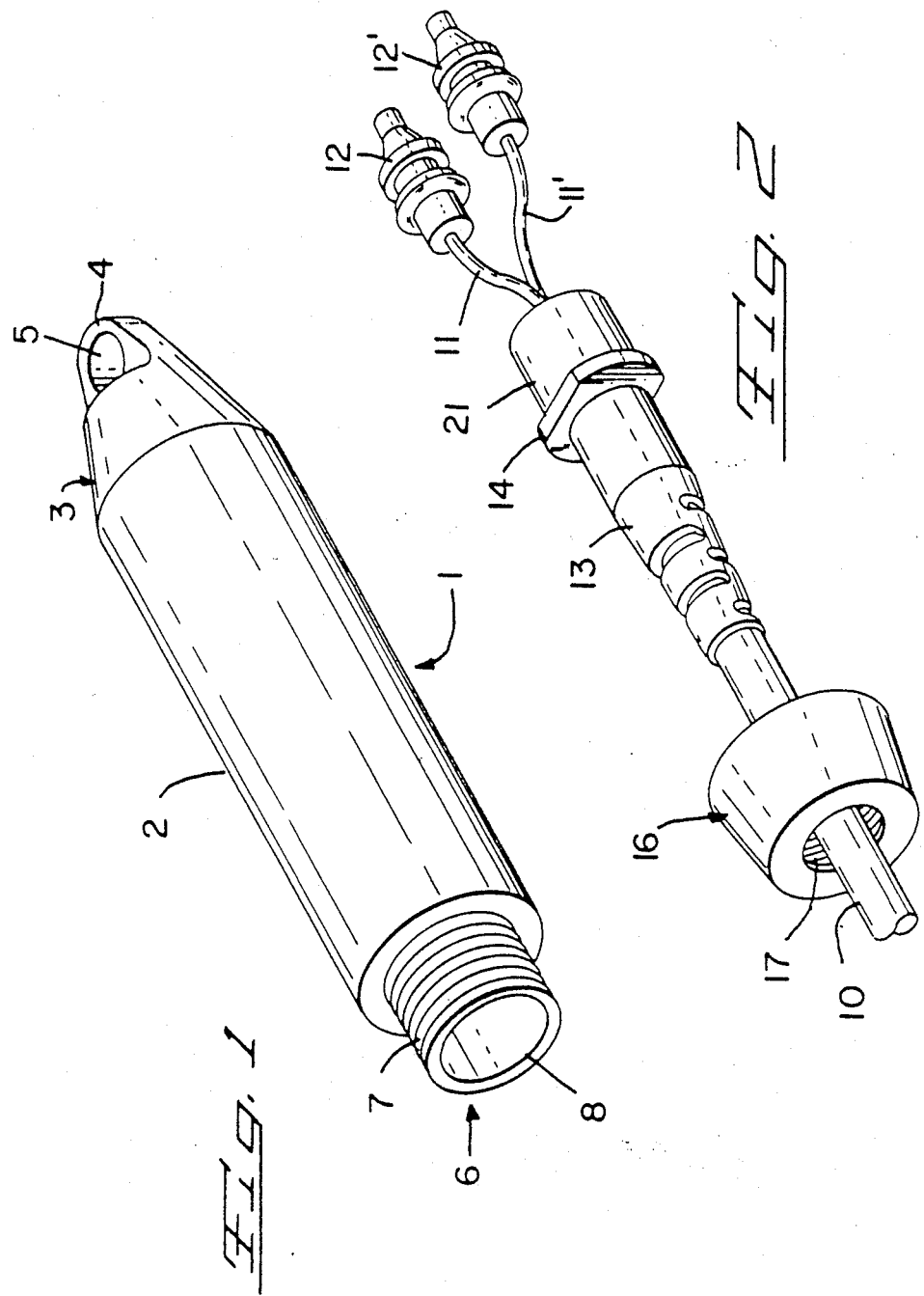

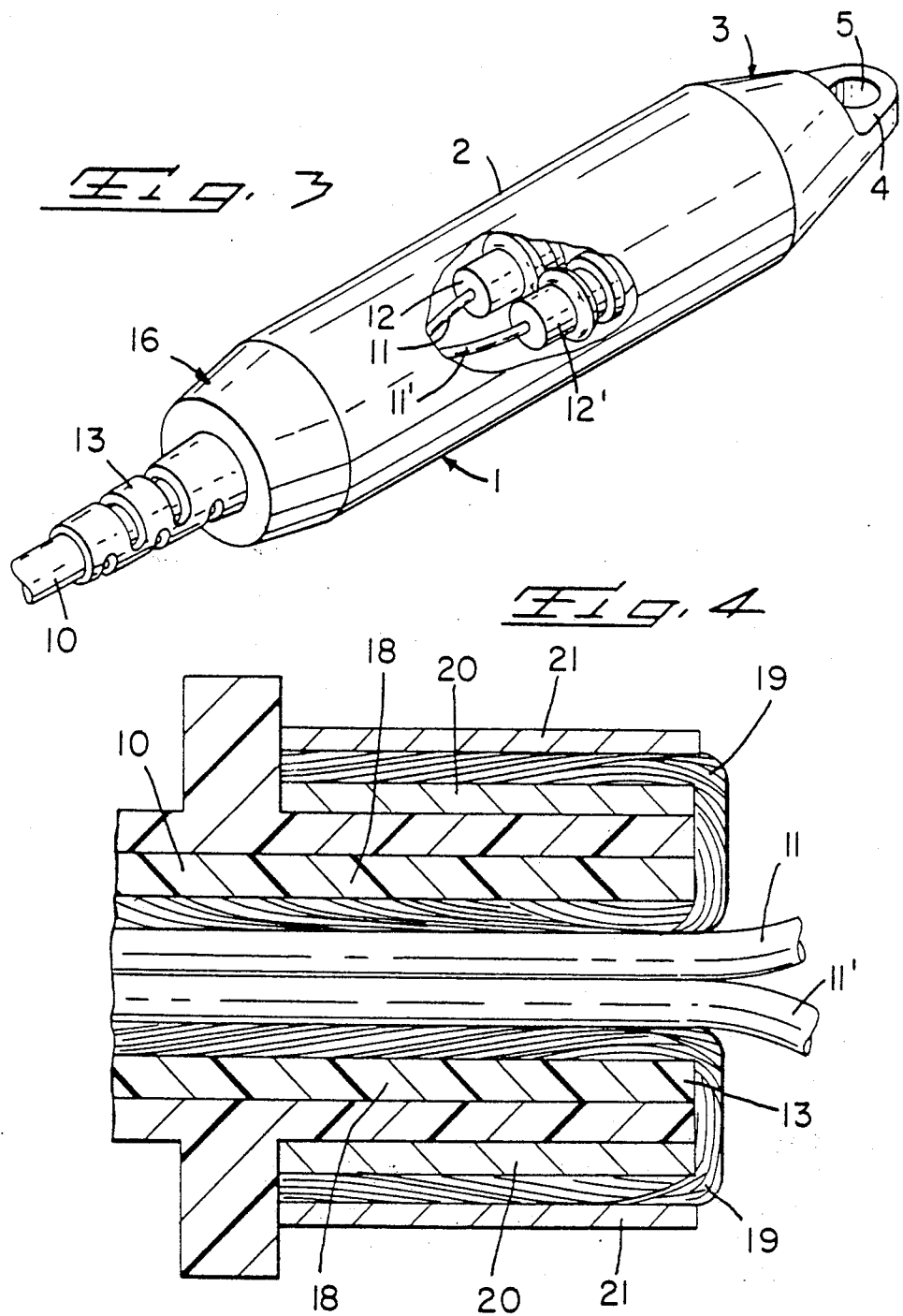

FIBER OPTIC CABLE PULLER

CROSS-REFERENCE TO RELATED APPLICATIONS

This application is related to copending U.S. patent application Ser. No. 618,851, filed June 8, 1984.

BACKGROUND OF THE INVENTION

This invention relates to a cable puller and more particularly relates to a cable puller for pulling fiber optic cables through ducts and conduits.

The development of fiber optic cables for transmitting electrical impulses has necessitated improvements, devices and equipment for working with fiber optic cables. Fiber optic cables are much more efficient than previous wire conductor cables and thus a fiber optic cable much smaller in diameter than a wire conductor can carry the same number of electrical impulses. In addition, fiber optic cable is much lighter than wire conductor cable.

However, because of the relative small diameter of optic fibers and their relative delicate nature or lightness, problems have developed in running the cable through ducts, conduits and the like. In running fiber optic cable through ducts and conduits, it is necessary that the fiber and its insulation not be damaged which would result in a reduction of the cable's efficiency in impulse transmitting ability. The present invention provides a novel, economical and advantageous cable puller for pulling fiber optic cables through ducts, conduits and the like.

SUMMARY OF THE INVENTION

It is accordingly one object of the present invention to provide a device for pulling fiber optic cable through ducts and conduits.

A further object of the invention is to provide a device of light and efficient structure which can be easily attached and detached to the terminated end of a fiber optic cable and may be efficiently used for pulling fiber optic cable through ducts and conduits.

Other objects and advantages of the present invention will become apparent as the description thereof proceeds.

In satisfaction of the foregoing objects and advantages, there is provided by this invention a device for pulling fiber optic cable through ducts and conduits which comprises:

(a) an elongated housing having a closed forward end and an open rearward end, and a central bore extending therethrough for reception of a pre-terminated fiber optic cable from said rearward end;

(b) grasping means provided on the forward end of said housing;

(c) fiber optic cable mounting means provided on the rearward end of said housing, said mounting means comprising a nose shell adapted to slide over said terminated fiber optic cable; and (d) attachment means to attach said nose shell to at least one load-bearing portion of said cable.

BRIEF DESCRIPTION OF THE DRAWING

Reference is now made to the drawings accompanying the application wherein:

FIG. 1 is a perspective view of the fiber optic cable puller of this invention;

FIG. 2 is a perspective view of a terminated fiber optic cable suitable for use with the cable puller of this invention;

FIG. 3 is a perspective view of the fiber optic cable puller of this invention secured to the fiber optic cable with a portion being shown in section; and FIG. 4 is an enlarged fragmentary cross sectional view of the puller shown in FIG. 2.

DESCRIPTION OF PREFERRED EMBODIMENTS

The present invention is directed to a device, called a cable puller, for pulling fiber optic cable through ducts, conduits such as ⅜" conduit, and other areas in which it is necessary to run fiber optic cable for connection to equipment such as computers and the like. According to the present invention, the fiber optic cable puller is designed so as to have one end firmly secured to the pre-terminated end of the fiber optic cable, and the other end provided with grasping means for pulling the assembly through ducts and conduits. In a preferred embodiment, the fiber optic cable puller of the invention is designed for attachment to one or more tensile load bearing members of the cable assembly. The cable puller is also designed so that the terminated end of the cable is normally contained within the housing of the cable puller so that the terminated ends of the fiber are protected during running of the cable. Further, the strain caused by the pulling action is not placed directly on the optic fibers but rather on tensile load-bearing members or portions of the cable.

A preferred embodiment of fiber optic cable puller of this invention is shown in perspective view in FIG. 1 where it will be seen that the cable puller 1 comprises an elongated housing 2 having a forward end and a rearward end. Forward end 3 is shown as being tapered in the embodiment of this invention. The forward end is also provided with grasping means 4 provided with eyelet 5 for attachment of a pulling cable, string or the like. It will be understood that grasping means 4 can be designed other than with the eyelet 5 for suitable grasping and pulling.

The rearward end 6 of the cable puller is open as shown at 8. Open end 8 is provided so as to receive the terminated end of the fiber optic cable. Rearward end 6 is also provided with attachment means such as threaded portion 7 for threaded engagement with a threaded nut or cap disposed on the fiber optic cable as shown more particularly in FIG. 2.

Referring now to FIG. 2 it will be seen that there is shown a pre-terminated fiber optic cable. The pre-terminated fiber optic cable of FIG. 2 is shown more specifically and fully described in our copending U.S. patent application Ser. No. 618,851, filed June 8, 1984, and the disclosure of that copending application is hereby incorporated by reference in this application.

The pre-terminated fiber optic cable of FIG. 2 comprises insulated cable 10 of known construction provided with a pair of optical fibers 11 and 11', which are terminated by a ferrule 12 and 12'. As described in the copending application, the ferrules 12 and 12' are preferably formed of plastic material and have a fiber receiving axial bore and a suitable nose profile for attachment to a pair of fibers and a connector (not shown). The cable 10 is also provided with a strain relief 13 having an integral annular flange 14, secured to the cable 10 as shown in FIG. 4. A nut 16 provided with internal threads 17 is assembled over the cable, followed by assembly of the strain relief 13 over the cable. The cable has concentric layers comprised of, a jacket of insulation 18, tensile load resisting members 19, also known as strength members, and one or more optical fibers 11 and 11'. The strength members may comprise Kevlar plastics material in the form of filaments or fibers. The strength members 19 emerge from an end of the cable and are doubled back on themselves to overlie concentrically a metal ring 20, which is assembled concentrically over an end portion of the strain relief 13. A metal ring ferrule 21 is assembled concentrically over the members 19 and the ring 20. The ring 21 is crimped or radially collapses into compression against the members 19 and the ring 20, thereby firmly grasping the members 19.

Attachment of the cable puller of FIG. 1 to the terminated fiber optic cable of FIG. 2 is illustrated in FIG. 3 in a preferred embodiment where like reference numbers represent like parts of FIGS. 1 and 2. As shown in FIG. 3, the fiber optic cable puller of this invention has been inserted over the terminated fiber optic cable and secured by screwing nut 16 onto thread 7 at the rearward end of the housing of the cable puller. It will be noted that when the housing is secured by nut 16, the resultant structure appears to be integral with the cable 10 and strain relief 13. It will also be noted that fibers 11 and 11' and ferrules 12 and 12' are resting safely or "float" within the hollow bore of the housing 2 of the cable puller without strain being applied thereto.

After the cable puller has been secured to the fiber optic cable, it is then ready for running through ducts, conduits and the like. As will be understood, the cable puller protects the fibers 11 and 11' and also the ferrules 12 and 12'. Further, it will be noted that the cable puller does not place a strain on fibers 11 and 11'; rather any strain will be exerted on tensile load bearing members of the cable. The cable puller may be pulled through ducts and conduits using any desirable connection to forward portion 3 such as by attachment to eyelet 5.

As indicated above, it is an important aspect of the invention that the cable puller attach to tensile load-bearing members of portions of the cable. This has the effect of not placing additional stress on non-load bearing members of the cable such as the insulation 18 or the fibers. This feature is also effective to prevent peel-back and/or stretching of the cable insulation 18.

The invention has been described particularly with respect to attachment of the nose of the cable puller to a strain relief of the cable. However, it will be understood that the nose or rearward portion of the cable puller may be attached in any desired manner to any tensile load-bearing member or portion of the cable. For example, the cable puller could be attached to the outer covering of the cable by any desired means. It will be understood that the term "cable" in this application means all elements of the assembly including the fibers, their covering materials, tensile or stress load-bearing members and non-tensile load-bearing members. In this application tensile load-bearing members are those components of the asssembly which are under some stress when placed in operation. This includes the strain relief, the outer sheath, connectors and the like, but does not include the fibers.

The invention has been exemplified with respect to a pre-terminated cable wherein the fibers are attached to ferrules. However, the invention is also applicable for use with attachment to, and pulling of preconnectorized cable. In this case the connector attachment to the cable becomes a part of the cable puller as the cable puller may be attached directly to the connector.

The invention has been described herein with reference to certain preferred embodiments. However, as obvious variations thereon will become apparent to those skilled in the art, the invention is not considered to be limited thereto.

We claim:

1. An apparatus for pulling fiber optic cable which comprises:
 (a) an elongated housing having a closed forward end, an open rearward end, and a hollow portion for reception of a pre-terminated fiber optic cable including one or more ferrules terminated in corresponding ferrules which rest within the housing and which are inserted into said hollow portion from said rearward end;
 (b) grasping means provided on the closed forward end of said housing;
 (c) fiber optic cable mounting means provided on said rearward end of said housing said mounting means comprising a threaded nose adapted for attachment to a load-bearing strain relief portion of said cable; and
 (d) attachment means to attach said nose to said strain relief portion of said cable and comprising a threaded nut of said strain relief portion to engage threadably the nose.

2. An apparatus according to claim 1 wherein said pre-terminated fiber optic cable terminates in a connector and said housing encloses the connector.

3. An apparatus as recited in claim 1, and further including a first metal ring concentrically over the strain relief portion, tensile load bearing members of the cable emerging from the end of the cable and overlying the first metal ring, and a second metal ring assembled concentrically over the tensile load bearing members and the first metal ring.

* * * * *